United States Patent
Zhao et al.

(10) Patent No.: US 10,242,704 B2
(45) Date of Patent: Mar. 26, 2019

(54) COMMAND CLUSTERING FOR DATA STORAGE DEVICE

(71) Applicant: Western Digital Technologies, Inc., San Jose, CA (US)

(72) Inventors: Haibao Zhao, San Jose, CA (US); Bernhard Hiller, San Jose, CA (US); Francis Crimi, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/014,151

(22) Filed: Jun. 21, 2018

(65) Prior Publication Data

US 2019/0051324 A1     Feb. 14, 2019

Related U.S. Application Data

(60) Provisional application No. 62/542,648, filed on Aug. 8, 2017.

(51) Int. Cl.
    *G11B 5/54*          (2006.01)
    *G11B 5/60*          (2006.01)
    *G06F 3/06*          (2006.01)

(52) U.S. Cl.
    CPC ............ *G11B 5/607* (2013.01); *G06F 3/061* (2013.01); *G06F 3/0659* (2013.01); *G06F 3/0676* (2013.01)

(58) Field of Classification Search
    CPC .............................. G11B 5/54; G11B 5/59611
    USPC ..................................... 360/75, 77.02, 77.03
    See application file for complete search history.

(56) References Cited

U.S. PATENT DOCUMENTS

| | | | |
|---|---|---|---|
| 7,375,914 B1 | 5/2008 | Dieron et al. | |
| 7,385,777 B2 | 6/2008 | Satoh et al. | |
| 2007/0058280 A1 | 3/2007 | Wada et al. | |
| 2007/0247744 A1 | 10/2007 | Satoh et al. | |
| 2007/0268611 A1 | 11/2007 | Buch et al. | |
| 2008/0212226 A1* | 9/2008 | Uji ....................... | G11B 5/6005 360/75 |

* cited by examiner

*Primary Examiner* — Nabil Z Hindi
(74) *Attorney, Agent, or Firm* — Barry IP Law, P.C.

(57) ABSTRACT

A plurality of commands is received from a host to perform at least one of reading data and writing data on a magnetic storage media of a Data Storage Device (DSD). The plurality of commands is clustered for performance based at least in part on a timing control of a fly-height heater of the DSD that is configured to adjust a flying height of a head of the DSD while the head is flying over the magnetic storage media. A cluster of commands is performed including the plurality of commands by controlling the head to perform at least one of reading and writing data on the magnetic storage media for the cluster of commands.

20 Claims, 7 Drawing Sheets

COMMAND CLUSTERING FOR DATA STORAGE DEVICE

CROSS-REFERENCE TO RELATED APPLICATION

This application claims the benefit of U.S. Provisional Application No. 62/542,648, filed on Aug. 8, 2017, which is hereby incorporated by reference in its entirety.

BACKGROUND

Data Storage Devices (DSDs) are often used to record data onto or to reproduce data from a storage media. One type of storage media includes a rotating magnetic disk, such as in a Hard Disk Drive (HDD) or a Solid-State Hybrid Drive (SSHD). In such DSDs, a head is positioned in relation to a disk to magnetically read and write data in tracks on a surface of the disk. The head is typically located on a distal end of an actuator moved by a Voice Coil Motor (VCM).

The amount of data that can be stored on a disk in a given area (i.e., an areal density) generally continues to increase with each new generation of DSDs that use a disk to store data. As the areal density of disks increase, a fly-height of the head or the distance between the head and the disk surface typically decreases to be able to read and write data in smaller or narrower tracks on the disk. For example, many modern HDDs may have a fly-height of only several nanometers. At such relatively small distances, control of the fly-height becomes more important for avoiding errors when writing and reading data due to variations in the fly-height. In many cases, the fly-height can change when a write current used to write data on the disk causes part of a slider including the head to heat up and expand or protrude toward the disk, while reading data may not cause a similar type of heating and expansion toward the disk.

In order to provide a more consistent fly-height when reading and writing data, some recent DSDs include a fly-height heater on the slider that causes a bottom surface of the slider to expand or protrude closer to the disk surface when the heater is on, and cause the bottom surface of the slider to retract away from the disk when the heater is off. The turning on of the fly-height heater may then be controlled with the writing and reading of data on the disk to provide a more consistent fly-height. For example, before writing data, the fly-height heater may be turned on at a high-power to preheat the head and then the power may be reduced as writing begins so that the fly-height of the head remains relatively the same with the heating provided by the write current during the write process. Before reading data, the fly-height heater may be turned on to a high power to preheat the head before reading and then left at the high power to maintain relatively the same fly-height throughout the read process.

However, the use of Thermal Fly-Height Control (TFC) with a fly-height heater can reduce the usable life or reliability of the head. In one aspect, the greater amount of heat applied to the slider or head and the longer duration of heating for TFC can cause the materials of the slider or head to degrade and deteriorate more quickly than if TFC was not used. In another aspect, the lowering of the fly-height can increase the likelihood of contact with a lubricant on the disk surface or the disk itself, causing increased friction or wear on the slider or head. The lowered fly-height can also increase the accumulation of disk lubricant on the slider or head due to forces from air pressure, electrostatic forces, and/or intermolecular forces. Such accumulation of lubricant on the slider or head can interfere with the reliable reading or writing of data by the head.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example System Overview

Figure 1:
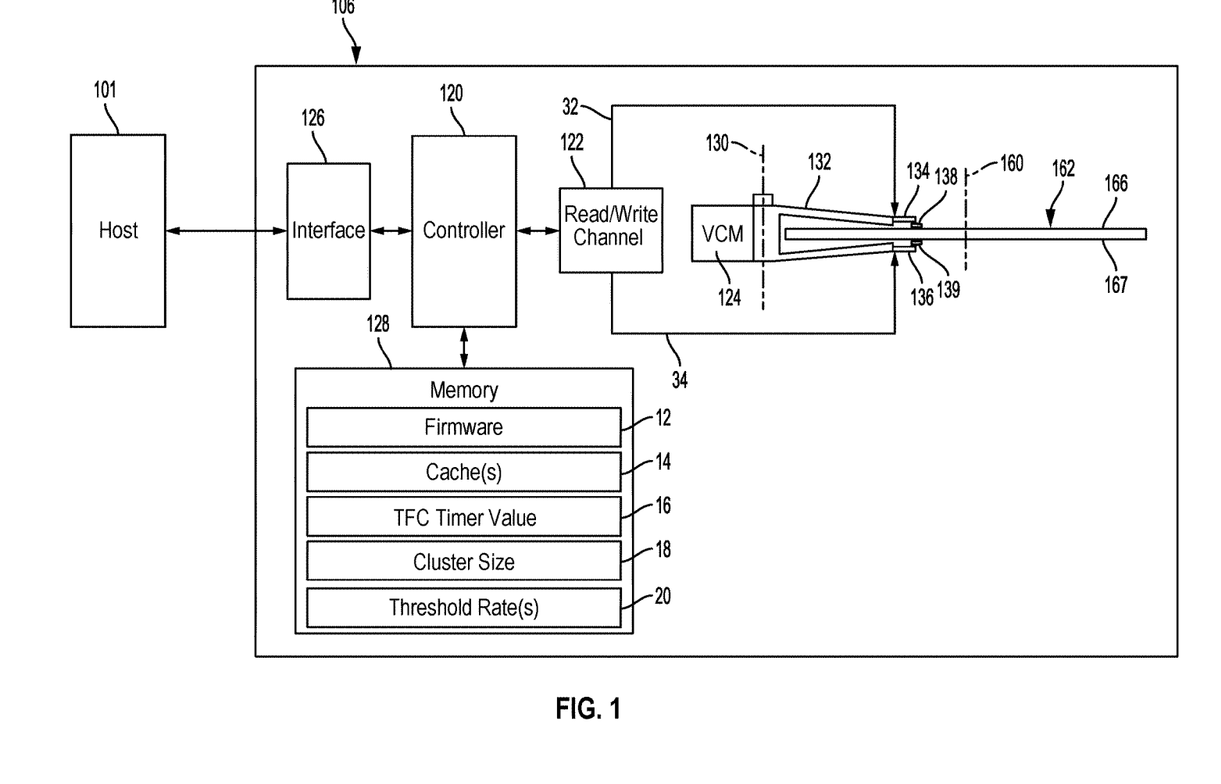
FIG. 1 is a block diagram of a Data Storage Device (DSD) that uses command clustering according to an embodiment.

FIG. 1 shows an example of Data Storage Device (DSD) 106 which communicates with host 101 according to an embodiment. Host 101 and DSD 106 may form a system, such as a computer system (e.g., server, desktop, mobile/laptop, tablet, smartphone, etc.), or other electronic device such as a Digital Video Recorder (DVR). The components of FIG. 1 may or may not be physically co-located. In this regard, host 101 may be located remotely from DSD 106.

Those of ordinary skill in the art will appreciate that other embodiments can include more or less than those elements shown in FIG. 1 and that the disclosed processes can be implemented in other environments with different configurations. For example, other embodiments can include a different number of heads and/or disk surfaces than those shown in FIG. 1, such as a disk pack of multiple radially aligned disks above or below disk 162.

DSD 106 includes controller 120, which includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof. In some implementations, controller 120 can include a System on a Chip (SoC).

Interface 126 is configured to interface DSD 106 with host 101 via a bus or network, and may interface using, for example, Ethernet or WiFi, or a bus standard such as Serial Advanced Technology Attachment (SATA), PCI express (PCIe), Small Computer System Interface (SCSI), or Serial Attached SCSI (SAS). As will be appreciated by those of ordinary skill in the art, interface 126 can be included as part of controller 120.

As shown in the example of FIG. 1, DSD 106 includes a rotating magnetic disk 162 as a Non-Volatile Memory (NVM). Disk 162 is rotated by a spindle motor (not shown) about disk axis 160, and includes disk surfaces 166 and 167 on opposite sides of disk 162. Sliders 138 and 139 are positioned so that a head on the slider (e.g., head 152 on slider 138 in FIG. 2) can read and write data on a corresponding disk surface of disk 162. Each of disk surfaces 166 and 167 includes a number of radially spaced, concentric tracks (not shown) for storing data.

Sliders 138 and 139 are connected to an end portion of Head Gimbal Assembly (HGAs) 134 and 136, respectively. HGAs 134 and 136 are connected to a distal end portion of actuator arm 132, which is rotated by Voice Coil Motor (VCM) 124 about actuator axis 130 to position the heads of sliders 138 and 139 in relation to tracks on disk surfaces 166 and 167, respectively. In some implementations, the positioning of the heads may also include one or more additional stages of actuator control, as in the example of piezoelectric actuators located toward the ends of actuator arm 132 to provide a second stage of actuation for finer positioning of the heads.

In the example of FIG. 1, controller 120 provides commands for accessing portions of disk 162 via a servo controller (not shown) and read/write channel 122. Those of ordinary skill in the art will appreciate that in some implementations, servo controller and/or read/write channel 122 may form part of controller 120. The servo controller sends VCM commands to VCM 124 to control movement of actuator arm 132 in positioning sliders 138 and 139 in relation to disk surfaces 166 and 167, respectively. In more detail, each of disk surfaces 166 and 167 can include servo wedges (not shown) that can provide location information (e.g., a servo burst) that can be read from the disk surface by a head to determine a position of the head. The servo controller or a spindle motor controller may also control rotation of disk 162 with a spindle motor control signal.

In addition, read/write channel 122 and/or other arm electronics (e.g., an arm electronics preamplifier) can provide Thermal Fly-Height Control (TFC) heater signals 32 and 34 to sliders 138 and 139, respectively. As discussed in more detail below with reference to FIG. 2, TFC heater signals 32 and 34 control the turning on or off and/or a power level of a fly-height heater located on each of sliders 138 and 139, respectively, to reduce a fly-height or distance between the head and its associated disk surface. This ordinarily allows for a more consistent fly-height or distance between the head and the disk surface when reading and writing data.

Memory 128 of DSD 106 is configured to store firmware 12, one or more caches 14, TFC timer value 16, cluster size 18, and one or more threshold rates 20. In some implementations, memory 128 can be a volatile memory such as Dynamic Random Access Memory (DRAM) with copies of one or more of firmware 12, TFC timer value 16, cluster size 18, and threshold rate(s) 20 stored in an NVM such as on disk 162 or another NVM of DSD 106, such as a non-volatile solid-state memory. In other implementations, memory 128 can be an NVM, such as a Magnetoresistive Random Access Memory (MRAM), or other type of non-volatile solid-state memory.

While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistive RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete Non-Volatile Memory (NVM) chips, or any combination thereof.

Firmware 12 includes computer executable instructions for execution by controller 120 in operating DSD 106. As discussed in more detail below, controller 120 can execute firmware 12 to allow for the clustering of commands for performance on disk 162 based at least in part on a timing control of a fly-height heater, such as a timing control provided by TFC timer value 16, a rate of commands received from host 101, and/or a spacing between commands received from host 101. The execution of firmware 12 by controller 120 may also allow for setting threshold rate(s) 20, as discussed in more detail below with reference to FIG. 10.

Cache(s) 14 can include one or more caches or buffers for temporarily storing data to be written on disk 162 (e.g., a write cache) or data that has been read from disk 162 (e.g., a read cache). In some cases, cache(s) 14 may temporarily store data to be written on disk 162 at a later time when it is more efficient to write the data, such as for a deferred write command. In such cases, controller 120 may use a Rotational Position Optimization (RPO) algorithm to reorder commands to reduce the amount of movement of sliders 138 and 139 when performing the commands.

In other cases, cache(s) 14 may temporarily store runt data read from disk 162 as part of a read-write-modify operation in performing an unaligned write command. Each track on disk 162 can include sectors of a fixed size such as 4,096 bytes (i.e., a 4 k sector). Host 101, on the other hand, may logically address data in a smaller fixed size, such as 512 bytes. Host 101 may then send unaligned write commands to DSD 106 where the amount of data to be written does not completely fill a whole number of sectors, or may send aligned write commands where the amount of data to be written completely fills a whole number of sectors. For unaligned write commands, DSD 106 may need to perform a read-write-modify operation so that data that was already written in the sector is not overwritten, since DSD 106 may only be able to completely write a whole sector at a time, rather than write part of the sector. To perform the unaligned write command, the preexisting data in the sector, referred to as runt data, is first read and stored in cache 14. The new data for the unaligned write command is then used to modify the runt data, such as by appending the new data to the runt data, and the modified data is then written to disk 162.

In yet other cases, cache 14 may be used to cluster read and write commands for performance on disk 162 so as to reduce the amount of time that a fly-height heater (e.g., fly-height heater 150 in FIG. 2) will need to be on. The clustering of commands may be based on commands to be performed on a particular disk surface, such that commands for disk surface 166 are clustered in one cache and commands for disk surface 167 are clustered in a different cache. In other implementations, such as where the fly-height heaters for sliders 138 and 139 are both controlled with a single TFC heater control signal, the commands for performance on disk surfaces 166 and 167 may be clustered together in a single cache.

As noted above, the amount of data that can be stored on disk 162 may depend on a width of the tracks on disk surfaces 166 and 167. Narrower tracks allow for more data to be stored in a given area on disk 162. However, narrower tracks also typically involve using a smaller distance or fly-height between the head and the disk surface. As the fly-height decreases for reading and writing data in narrower tracks, control of the fly-height becomes more important for avoiding errors that may be caused by variations in the fly-height when writing and reading of data.

In order to provide a more consistent fly-height, DSD 106 includes a fly-height heater on each of sliders 138 and 139 that causes a bottom surface or Air Bearing Surface (ABS) of the slider to expand or protrude closer to the disk surface when the fly-height heater is on, and to retract away from the disk surface when the fly-height heater is off. The turning on of the fly-height heater and/or the power generated by the fly-height heater is then controlled with the writing and reading of data to provide a more consistent fly-height.

As part of this Thermal Fly-Height Control (TFC), the operation of the fly-height heater may be controlled in part by a timer that determines when the fly-height heater will turn off based on a set amount of time. The timer can start when performance of a command begins (i.e., the start of writing or reading of data on the disk), and can end when either the timer runs out, or when a new command requires a long seek or performance by a different head, which prevents the heater from staying on for some or all of the remainder of the set amount of time after performance of the completed command. In the example of FIG. 1, the set amount of time for the timer is stored as TFC timer value 16 in memory 128.

TFC timer value 16 may be set to usually allow time to perform a write command or read command again if any errors are encountered, as a write-retry or a read-retry without having to preheat the slider. In some implementations, TFC timer value 16 can correspond to an amount of time needed to complete a certain number of revolutions of disk 162 at an operating angular velocity (e.g., 7200 Revolutions Per Minute (RPM) or 5400 RPM). For example, TFC timer value 16 may correspond to a time needed to complete an average length command and five revolutions of disk 162 when spinning at 7200 RPM.

As noted above, the use of TFC can reduce the usable life and reliability of the head. In one aspect, the greater amount and duration of heat applied to the slider or head for TFC can cause the materials of the slider or head to degrade or deteriorate more quickly than if TFC was not used. This may further decrease the life of heads that use newer technologies such as Heat Assisted Magnetic Recording (HAMR) or Microwave Assisted Magnetic Recording (MAMR) that may already have a shorter life expectancy as compared to more conventional heads due to these technologies involving the heating of a disk surface or applying a high frequency magnetic field to the disk surface. The decrease in fly-height due to TFC can also increase the likelihood for contact with a lubricant on the disk surface or another part of the disk surface, which may cause increased friction or wear on the slider or head as compared to only contacting air or another gas. The lowered fly-height may also increase the accumulation of disk lubricant on the slider or head due to forces from air pressure, electrostatic forces, and/or intermolecular forces. Such accumulation of lubricant on the slider or head can interfere with the reliable or accurate reading and writing of data by the head.

The present disclosure ordinarily allows for extending the life of sliders and heads that use TFC by reducing the amount of time that the fly-height heater needs to be powered on. This is accomplished by clustering read and/or write commands for performance on disk 162 so that the TFC timer value is applied on a per cluster basis, as opposed to a per command basis.

Returning to the example of FIG. 1, cluster size 18 in memory 128 can include a predetermined period of time for grouping or clustering commands received from host 101. For example, cluster size 18 can be a 100 ms period such that read and write commands received from host 101 during the 100 ms period are clustered together for performance on disk 162 with a single on time of the fly-height heater as part of TFC timer value 16 after the completion of the last command in the cluster, as opposed to multiple periods of the fly-height heater being on after the completion of each command.

As discussed in more detail below, controller 120 may only cluster certain types of commands, such as random read and write commands to read or write data associated with non-sequential logical addresses (e.g., Logical Block Addresses (LBAs)). In this regard, performing random host commands from host 101 to read or write data that is logically addressed with non-sequential addresses typically involve seeking or moving the head to different locations on the disk surface to perform the random commands. In conventional TFC, the fly-height heater may remain on after performing each random command. In contrast, clustering such random commands can allow for only leaving the fly-height heater on following a last command in the cluster.

For sequential commands where the reads or writes are for data that is sequentially addressed, the fly-height heater may remain on after performing the last sequential command, since the data for performing sequential read or write commands can be performed as one long or continuous read or write operation. Accordingly, the clustering of commands in some implementations may only be applied to random commands to read or write data at non-sequential logical addresses. In other implementations, the clustering of commands may be applied based on whether the cluster includes at least one random command or DSD 106 may automatically treat one or more sequentially addressed (e.g., sequential logical or sequential physical addresses for temporally adjacent commands) as a single command that is eligible for clustering with other commands within cluster size 18.

Threshold rate(s) 20 can include an upper rate threshold for enabling or disabling the clustering of commands for performance on disk 162. As discussed in more detail below with reference to FIG. 5, when the rate of commands received from host 101 for a disk surface or disk exceeds an upper rate threshold, the overall amount of time that a fly-height heater is on when clustering commands may exceed the overall amount of time that the fly-height heater would be on without clustering commands. The clustering of commands may then be disabled if the command rate exceeds the upper threshold rate. In one aspect, the upper threshold rate(s) may correspond to different time intervals or approximate time intervals between commands such that a higher upper threshold rate means that there is less time between each command. Accordingly, some implementations may instead use one or more predetermined time intervals between commands as thresholds to enable or disable command clustering.

Figure 6A:
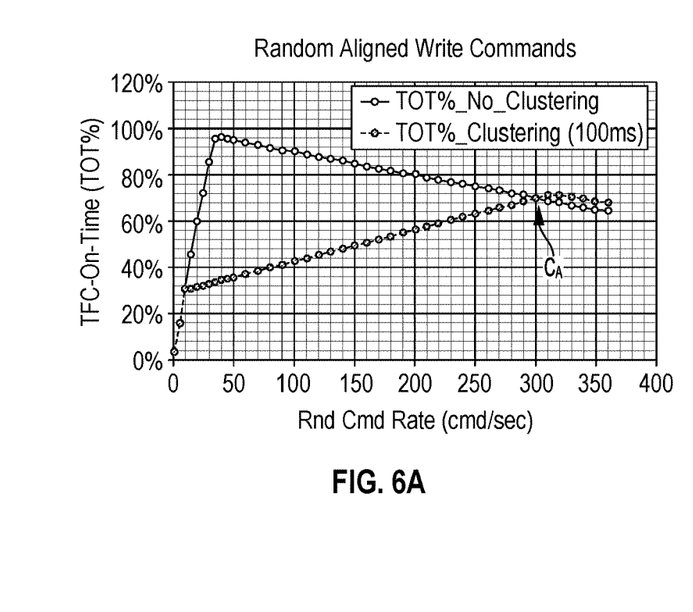
FIG. 6A is a graph depicting the reduction in time that a fly-height heater is on due to the clustering of aligned random write commands at different command rates according to an embodiment.
Figure 6B:
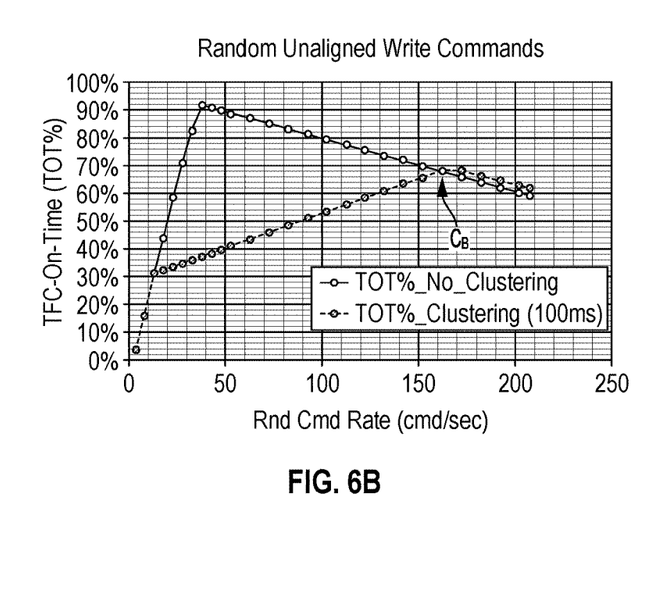
FIG. 6B is a graph depicting the reduction in time that a fly-height heater is on due to the clustering of unaligned random write commands at different command rates according to an embodiment.

Threshold rate(s) 20 may also include different upper threshold rates for different types of commands, such as whether the commands received for a cluster include unaligned write commands or aligned write commands, as discussed in more detail below with reference to FIGS. 6A and 6B. In some implementations, threshold rate(s) 20 may also include a lower threshold rate so that the clustering of commands is disabled if the rate of commands received from host 101 falls below the lower threshold rate. This may be done for performance reasons so that the performance of commands received at a lower command rate or that are more spaced apart do not have to wait until the end of the time period for the cluster before being performed.

In operation, controller 120 receives host read and write commands from host 101 via interface 126 for reading data from and writing data on disk surfaces 166 and 167 of disk 162. Interface 126 may provide information on the types of commands (e.g., random, sequential, read, write, unaligned write, aligned write), a timing between commands, or a command rate to controller 120 or controller 120 may determine some or all of such information independent from interface 126.

In response to a write command from host 101, controller 120 may buffer the data to be written for the write command in a cache 14 (e.g., a write cache or media cache) or another memory. For data to be written on a disk surface, a write channel of read/write channel 122 may encode the buffered data into a write signal, which is provided to a head for magnetically writing data on a disk surface that has been assigned logical addresses for the data in the write command. In addition, controller 120 via a servo controller can provide VCM commands to VCM 124 to position a head over a particular track for writing the data.

In response to a read command for data stored on disk surface 166 or 167 of disk 162, controller 120 via the servo controller positions a head over a particular track on the disk surface that has been assigned logical addresses for the data in the read command. Controller 120 controls the head to magnetically read data stored in the track, and to send the read data as a read signal to a read channel of read/write channel 122. Read/write channel 122 can then decode and buffer the data into a cache 14 (e.g., a read cache) of memory 128 or another memory for transmission to host 101 via interface 126.

Figure 2:
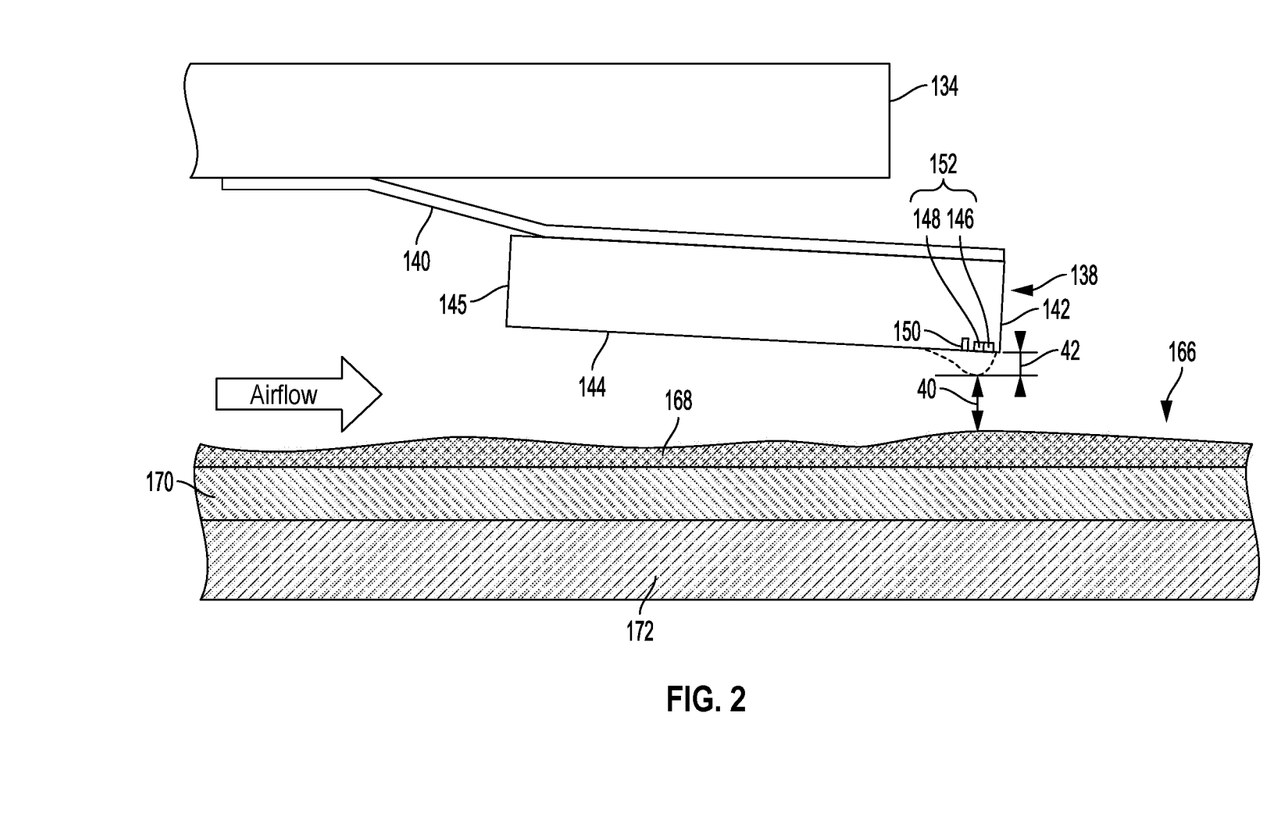
FIG. 2 is a close-up view of a slider including a fly-height heater when flying over a disk surface of the DSD of FIG. 1.

FIG. 2 is a close-up view of slider 138 including fly-height heater 150 when flying over disk surface 166. As shown in FIG. 2, slider 138 is connected HGA 134 by elastic flexure 140, which supports slider 138 on HGA 134. Elastic flexure 140 also includes wiring for operating head 152 on slider 138 and for controlling the operation of fly-height heater 150.

Slider 138 includes leading edge 145, ABS 144, and trailing edge 142. Airflow moves in the direction indicated by the arrow labeled "Airflow," and leading edge 145 encounters airflow before trailing edge 142, which floats over disk surface 166. Slider 138 also includes head 152, which further includes read element 148 for magnetically reading data from disk surface 166, and write element 146 for magnetically writing data on disk surface 166.

As shown in FIG. 2, slider 138 includes fly-height heater 150 to lower the fly-height of head 152 by heating a portion of slider 138 including head 152 so that the slider deforms or protrudes toward disk surface 166, as indicated in FIG. 2 with dashed lines. The fly-height is then reduced by distance 42 to TFC distance 40 due to the thermal expansion of slider 138 toward disk surface 166. As noted above, TFC distance 40 may be on the scale of only a few nanometers in modern DSDs.

As will be appreciated by those of ordinary skill in the art, other implementations of slider 138 may include a different arrangement of write element 146, read element 148, and fly-height heater 150 than the example shown in FIG. 2. For example, in some implementations, fly-height heater 150 may be located between write element 146 and read element 148. In yet other implementations, slider 138 may include two fly-height heaters 150 such that a respective fly-height heater of the pair of fly-height heaters 150 is controlled for each of write element 146 and read element 148. In another implementation, a pair of fly-height heaters 150 may provide two stages of heating.

Disk surface 166 includes a layer of lubricant 168, that may include, for example, a perfluoropolyether (PFPE) lubricant. In the example of FIG. 2, disk surface 166 further includes a protective overcoat layer 170 and a recording layer 172 that is magnetized by write element 146 to record data, and that can be magnetically read by read element 148. Overcoat layer 170 may be a carbon-based layer and serve to protect recording layer 172 from corrosion and to improve the durability of disk 162. Recording layer 172 may include one or more layers of an alloy, such as a cobalt, chromium, and platinum alloy that is magnetized by head 152.

Examples of Reducing TFC on Time by Command Clustering

Figure 3:
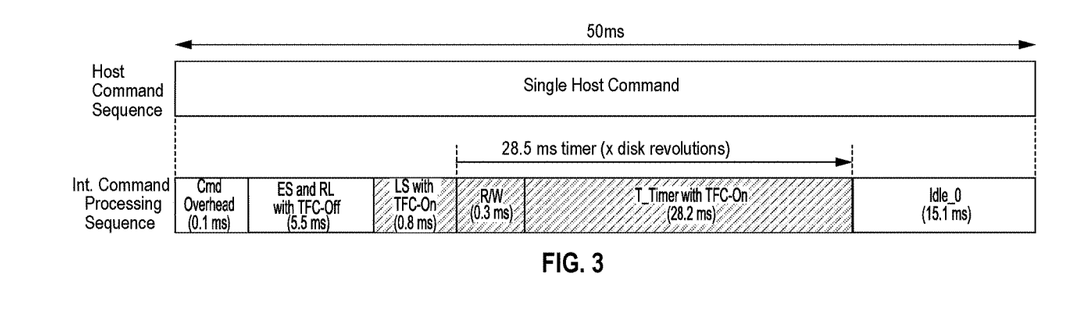
FIG. 3 illustrates an example of time periods when a fly-height heater is on and off for performing a single command on a disk.

FIG. 3 illustrates an example of time periods when fly-height heater 150 is on and off for performing a single command on disk surface 166. The time periods when fly-height heater 150 is on are represented by the cross-hatched blocks in the internal command processing sequence. The time periods when fly-height heater 150 is off are represented by the blocks without cross-hatching in the internal command processing sequence. As will be appreciated by those of ordinary skill in the art, the actual time values shown in FIG. 3 may vary based on different factors, such as an operating speed of disk 162, a seek distance to perform the command, the value set for TFC timer 16, a processing time for preparing the command for performance, the amount of data to be written or read, the type of command (e.g., an aligned write command or an unaligned write command), or the rate at which commands are received from host 101.

As shown in FIG. 3, for a single host command when host commands are being received at a relatively evenly spaced command rate of 20 host commands per second, each command has 50 ms for performance on disk 162 (i.e., 1 second divided by 20 commands per second equals 50 ms). In the example of FIG. 3, 0.1 ms is used for Command Overhead (CO) processing, such as for translation between a logical address (e.g., LBA) for the data to be written or read to a physical address on disk 162 (e.g., a Physical Block Address (PBA)), or queuing of the command for performance. During this initial 0.1 ms, fly-height heater 150 is powered off.

Proceeding to the right on the internal command processing sequence, 5.5 ms is spent to initially seek or move head 152 toward the location on disk 162 for writing or reading data for the command (i.e., moving toward a particular track corresponding to a physical address) during an Early Seek (ES). Some of the 5.5 ms may also include time for a Rotational Latency (RL) for the sector or sectors of disk surface 166 that are to be accessed by the command to rotate into a position near head 152. During the next block of 0.8 ms, fly-height heater 150 is turned on during a Late Seek (LS) to preheat a portion of slider 138 including head 152 so that head 152 can begin to expand or protrude toward disk surface 166 just before reaching the sector or sectors that are to be accessed in writing or reading data for the command.

In the next 0.3 ms block for Read/Write (R/W), data is written or read using write element 146 to magnetically write data or read element 148 to magnetically read data. Fly-height heater 150 stays on during the performance of the command to help maintain a relatively consistent fly height. As noted above, the power generated by fly-height heater 150 may either stay at the same power level for a read command, or the power generated by fly-height heater 150 may drop with the beginning of writing data to compensate for the heating caused by write element 146 in maintaining a consistent fly-height. In addition, a TFC timer begins with the writing or reading of data so that fly-height heater 150 remains on for TFC timer value 16. In the example of FIG. 3, TFC timer value 16 is 28.5 ms, which may correspond to a number of revolutions of disk 162 at an operating RPM.

At the expiration of the timer, fly-height heater 150 turns off and slider 138 enters an idle mode (i.e., Idle_0 in FIG. 3), where slider 138 may remain at its current position in relation to disk surface 166, or move toward an idle position in anticipation of a next host command. Out of the overall 50 ms for performing the command, fly-height heater 150 is on for 26.3 ms, or for approximately 58.6% of the total 50 ms for performing the command. As discussed below, the overall amount of time that fly-height heater 150 is on can be reduced for a range of command rates by clustering commands for performance based at least in part on a timing control of fly-height heater 150.

In this regard, cluster size 18 may be selected based on TFC timer value 16. The selection of a cluster size may be set as part of firmware 12 during a manufacturing process, or may be set or adjusted in the field based on a history of commands received by DSD 106, health characteristics of the head (e.g., an error rate or amount of use), or performance criteria for DSD 106. For example, cluster size 18 may initially be set at 100 ms, but may be increased to 120 ms as the use of head 152 increases so that more commands can be included in a single cluster. On the other hand, if the performance of commands (e.g., Input/Output Operations Per Second (IOPS)) falls below a predetermined level, cluster size 18 may be reduced to 80 ms so that commands can be performed quicker.

Figure 4:
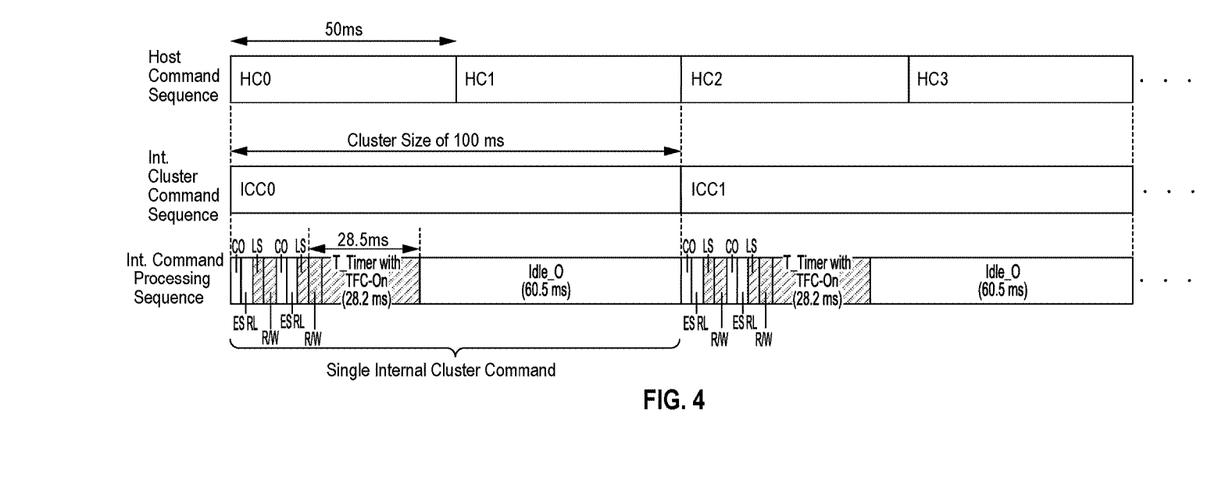
FIG. 4 illustrates the clustering of a plurality of host commands for performance based at least in part on a timing control of the fly-height heater according to an embodiment.

FIG. 4 illustrates the clustering of a plurality of host commands for performance based at least in part on a timing control of fly-height heater 150 according to an embodiment. As with FIG. 3, the times provided in FIG. 4 are provided merely as examples to illustrate how commands can be clustered to reduce an overall time that a fly-height heater is on. Those of ordinary skill in the art will appreciate that actual times for each block of time in FIG. 4 can vary based on factors, such as an operating speed of disk 162, a seek distance to perform the command, the value set for TFC timer 16, a processing time for preparing the command for performance, the amount of data to be written or read, the type of command (e.g., an aligned write command or an unaligned write command), or the rate at which commands are received from host 101.

As shown by the host command line in FIG. 4, commands are received at the same rate of approximately 20 commands per second as in FIG. 3, but the clustering of commands into a cluster size of 100 ms reduces the overall amount of time that fly-height heater 150 is on. At a command rate of 20 commands per second, each 100 ms cluster includes two host commands. The first two Host Commands (HCs) in FIG. 4, HC0 and HC1 are clustered together into a single Internal Cluster Command (ICC) 0. The internal command processing sequence in FIG. 4 includes the CO processing of 0.1 ms for HC0, 5.5 ms for the beginning of seeking to a location for performing HC0 and for rotational latency in the ES RL block, before turning on fly-height heater 150. During the LS block for HC0, fly-height heater 150 is turned on to preheat head 152 before performing HC0, which is then performed in the next 0.3 ms R/W block with fly-height heater 150 on.

Rather than keep fly-height heater 150 on for the remainder of TFC timer value 16 (e.g., 28.2 ms in the example of FIG. 3), fly-height heater 150 is turned off at the completion of reading or writing data for HC0, and processing for HC1 begins in the next 0.1 ms CO block. A 5.5 ms ES block then follows for a first part of seeking to the location for performing HC1. Fly-height heater 150 then turns on to preheat head 152 during a second part of seeking to the location for performing HC1 in the LS block, and remains on during the next 0.3 ms R/W block as data is read or written for HC1. The timer for turning off fly-height heater 150 also begins with the reading or writing of data in the R/W block for performing HC1.

At the expiration of the timer, fly-height heater 150 turns off and head 152 enters an idle mode (i.e., Idle_0 in FIG. 4) for the remaining 60.5 ms of the 100 ms cluster. This process is then repeated for the next two host commands, HC2 and HC3, which are received during the next 100 ms cluster and performed on disk 162 as part of ICC1, which is broken down into a similar sequence of blocks in the internal command processing sequence as for HC0 and HC1.

For the same host command rate as in FIG. 3 of 20 commands per second, the clustering of commands in FIG. 4 reduces the overall on time of fly-height heater 150 by 28.2 ms for every two commands, so that fly-height heater 150 is only on for 30.4% of the total 100 ms used to complete the two commands, as compared to 58.6% of the total 100 ms used to complete two commands that are not clustered together. By controlling the fly-height heater to remain on after the performance of the last command in the cluster, it is still also possible to maintain the lower fly-height in case any write retries or read retries need to be performed for errors encountered when performing commands in the cluster. Moreover, the overall amount of time that fly-height heater 150 is on can ordinarily be reduced by clustering commands, which can extend the usable life of the head and improve a long-term accuracy of the head.

Figure 5:
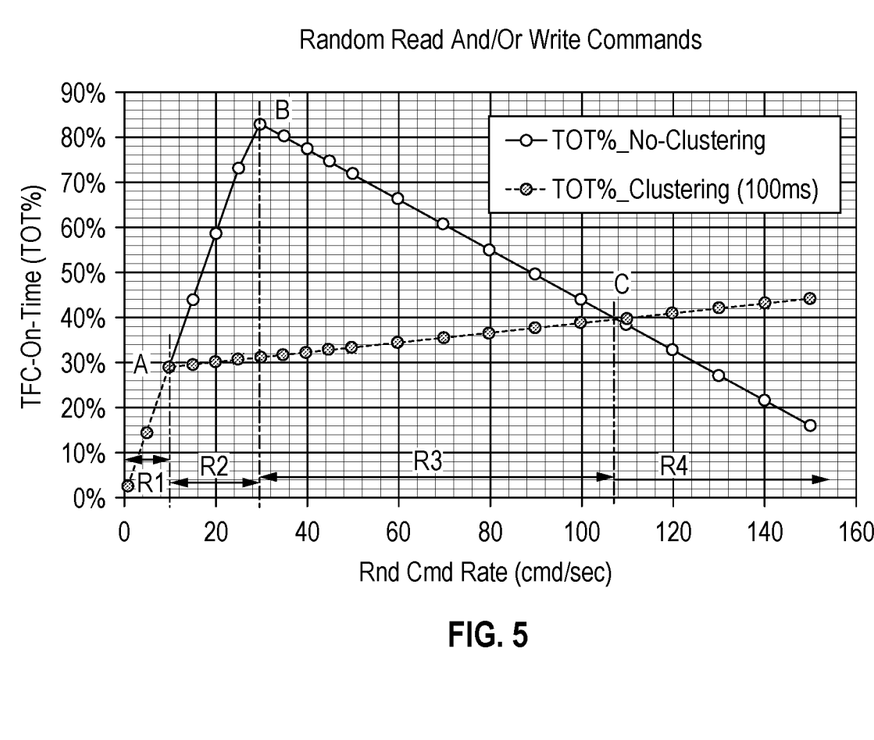
FIG. 5 is a graph depicting the reduction in time that a fly-height heater is on due to the clustering of random commands at different command rates according to an embodiment.

FIG. 5 is a graph depicting the reduction in time that fly-height heater 150 is on when clustering random commands for different command rates according to an embodiment. As shown in FIG. 5, the reduction in the on-time of fly-height heater 150 will vary based on the command rate. The solid plotted curve in FIG. 5 indicates a percentage of a total time that fly-height heater 150 is on (i.e., TOT % in FIG. 5) while performing random commands without clustering commands. The total time can include a command overhead time, a rotational latency and early seek time, a late seek time with fly-height heater on, a read/write time with fly-height heater 150 on, any remaining amount of TFC timer value 16 with fly-height heater 150 on, and any idle time (e.g., Idle_0 in FIG. 4), as allowed by the command rate. The dashed plotted curve in FIG. 5 indicates a percentage of the total time that fly-height heater 150 is on when clustering commands.

Below a command rate of A in a command rate range of R1, the percentage of TFC on-time is the same for both clustering and no clustering. At command rate A of 10 commands per second, the average number of commands per 100 ms cluster is one command per cluster. After exceeding command rate A, the TFC on-time for clustering begins to reduce from the TFC on-time without clustering since more than one command can be included in a single 100 ms cluster. In some implementations, the clustering of commands may be disabled if the command rate is below a lower threshold rate of A, since waiting after receiving a command when in command rate range R1 may increase the completion time for commands without providing any reduction in TFC on-time. In other implementations, the clustering of commands may be enabled regardless of whether the command rate falls below a particular threshold rate such as A.

At command rate B of 30 commands per second, the clustering of commands provides its greatest reduction in TFC on-time. As the command rate continues to increase, the reduction in TFC on-time provided by clustering decreases mostly due to the premature shortening of the time that fly-height heater 150 remains on following each command in order to seek to the next location for the next command. The amount of TFC on-time when clustering commands also gradually increases with the increased number of commands for each cluster, which requires more preheating and heating by fly-height heater 150 when reading and writing data for the additional commands in each cluster.

At command rate C of approximately 105 commands per second, the percentage of the total time that fly-height heater 150 is on (i.e., TOT % in FIG. 5) begins to be higher for clustered commands than for commands without clustering. Command rate C may therefore serve as an upper threshold rate that may be stored as part of threshold rate(s) 20 for controller 120 to use to disable the clustering of commands. In some implementations, the clustering of commands may be enabled for command rate ranges R2 and R3, and disabled for command rate ranges R1 and R4. In other implementations, the clustering of commands may be enabled for command rate ranges R1 to R3.

In some implementations, an upper threshold rate for disabling command clustering may be set below the cross-over command rate C so that clustering is disabled in anticipation of reaching the cross-over or C command rate. Since the difference between TFC on-times for clustering and not clustering converge when approaching the C command rate, setting the upper threshold rate slightly below the C command rate may not cause too much loss in the reduction of TFC on-time before reaching the C command rate. In addition, and as in the example of FIG. 5, the rate of decrease of TFC on-time without clustering may be greater than the rate of increase of TFC on-time with clustering, such that disabling clustering in anticipation of a higher command rate may further reduce TFC on-time.

Controller 120 may also use different upper threshold rates depending on the types of commands being received from host 101, such as whether the commands include aligned or unaligned write commands. FIGS. 6A and 6B compare the reduction in time that fly-height heater 150 is on for aligned versus unaligned write commands for different command rates according to an embodiment. As shown in FIG. 6A, the command rate, $C_A$, where the TFC on-time for clustered commands begins to exceed the TFC on-time for commands that are not clustered occurs at a command rate of 300 commands per second for aligned random write commands. On the other hand, the cross-over command rate, $C_B$, for unaligned random write commands in FIG. 6B occurs at a lower command rate of approximately 160 commands per second. Controller 120 may therefore use different upper threshold rates for disabling command clustering depending on whether the commands received from host 101 include aligned or unaligned write commands.

Example Command Clustering Processes

Figure 7:
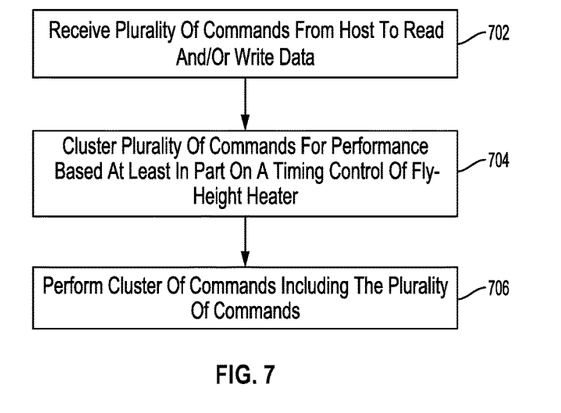
FIG. 7 is a flowchart for a command clustering process according to an embodiment.

FIG. 7 is a flowchart for a command clustering process that can be performed by controller 120 executing firmware 12 according to an embodiment. In block 702, DSD 106 receives a plurality of commands from host 101 for reading and/or writing data on a magnetic storage media, such as disk 162. In some implementations, the plurality of commands may only include random host commands for reading or writing data associated with non-sequential logical addresses. In other implementations, the plurality of commands may include a mix of sequential and random commands. In addition, the plurality of commands may or may not all be for a particular disk surface.

In block 704, controller 120 clusters the plurality of commands for performance based at least in part on a timing control of a fly-height heater, such as fly-height heater 150. For example, cluster size 18 (e.g., 100 ms) may be set based on a timer value for keeping fly-height heater on during and after performing a last command of the cluster of commands (e.g., TFC timer value 16), among other considerations that may affect the timing control of the fly-height heater such as an expected rate of commands or an operating angular velocity of a disk. In the example of FIG. 4, a plurality of commands can be HC0 and HC1 that are clustered together for performance on disk 162 with a single internal cluster command.

In block 706, controller 120 performs the cluster of commands including the plurality of commands by controlling a head (e.g., head 152) to read and/or write data on a disk for the plurality of commands. In some implementations, and as discussed above with reference to FIG. 4, this can include periods of preheating and heating the head to perform the plurality of commands, followed by a remaining heating time to complete TFC timer value 16. Such clustering of commands can ordinarily reduce the overall amount of time that a fly-height heater is on below an upper threshold command rate by sharing the remaining heating time among multiple commands in a cluster, instead of heating after each command without clustering.

Figure 8:
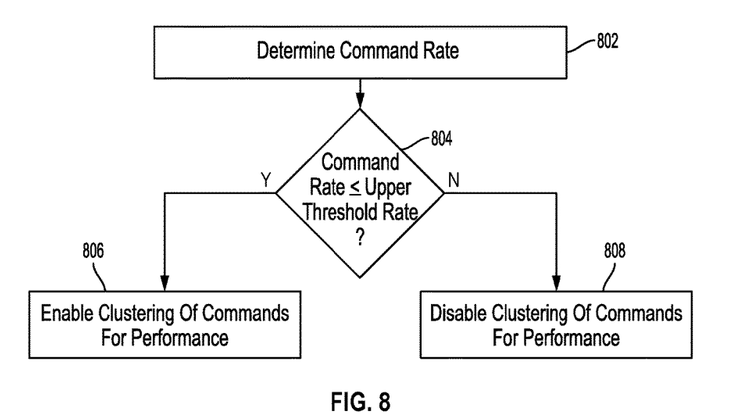
FIG. 8 is a flowchart for an enabling and disabling process for clustering commands according to an embodiment.

FIG. 8 is a flowchart for an enabling and disabling process for clustering commands that can be performed by controller 120 executing firmware 12 according to an embodiment. In block 802, controller 120 determines a command rate for read and/or write commands received from host 101. In some implementations, the command rate may be an average or median command rate. For example, the command rate can be determined as the inverse of an average or median time interval between read and/or write commands for a predetermined number of commands, such as ten commands. This may allow for the exclusion of additional commands that follow a first command in a burst of continuous commands that may otherwise misrepresent a command rate over a relatively longer period of time. In other implementations, the determined command rate may correspond to a number of read and/or write commands received during a predetermined period of time, such as during a one second period, or an average or median number of commands received over multiple predetermined periods of time. In some implementations, interface 126 may provide information to controller 120 for determining the command rate or may pass the command rate to controller 120 based on the receipt of commands from host 101.

In addition, the command rate determined in block 802 may be for a subset of commands received from host 101. For example, controller 120 may identify whether received commands are for sequential or random commands by comparing logical addresses for the data to be written or read for the commands. The determined command rate in block 802 may then only correspond to a rate of, for example, random commands received from host 101. In another example, the determined command rate may only correspond to a command rate for commands to be performed on a particular surface of disk 162, such as disk surface 166 or 167. In such examples, controller 120 may determine a command rate for each disk surface and enable or disable the clustering of commands for each disk surface independently. In other examples, the determined command rate may be for all disk surfaces such that the clustering of commands is enabled or disabled for all disk surfaces.

In block 804, controller 120 determines whether the command rate is less than or equal to an upper threshold rate, such as command rate C discussed above with reference to FIGS. 5, 6A, and 6B. In other implementations, the upper threshold rate may be set below a cross-over command rate, or the determination in block 804 may instead be whether the command rate determined in block 802 is less than the upper threshold rate rather than less than or equal to the upper threshold rate. As discussed above with reference to FIGS. 6A and 6B, the upper threshold rate may also depend on the type of commands being received from host 101, such as whether the commands include aligned or unaligned write commands.

If it is determined in block 804 that the command rate is less than or equal to the upper threshold rate, controller 120 in block 806 enables the clustering of commands for performance on disk 162. A plurality of commands received from host 101, which preferably includes commands used to determine the command rate in block 802, are grouped together or clustered during a predetermined period of time corresponding to cluster size 18 (e.g., 100 ms). As noted above, the cluster size can depend on the timing control of a fly-height heater, such as fly-height heater 150. In addition, the enabling or disabling of the clustering of commands in the process of FIG. 8 is also dependent on the timing control of a fly-height heater since the upper threshold command rate for enabling or disabling the clustering is based on the timing control of the fly-height heater, as shown with command rate C in FIGS. 5, 6A, and 6B.

If it is determined in block 804 that the command rate is greater than the upper threshold rate, controller 120 in block 808 disables the clustering of commands for performance on disk 162. As noted above, when the command rate is higher than a cross-over command rate (e.g., command rate C in FIGS. 5, 6A, and 6B), the fly-height heater is on for a greater amount of time with clustering than without clustering. The clustering of commands is therefore disabled when the command rate exceeds the upper threshold rate, which may correspond to the cross-over command rate or a rate that is approaching the cross-over command rate.

Figure 9:
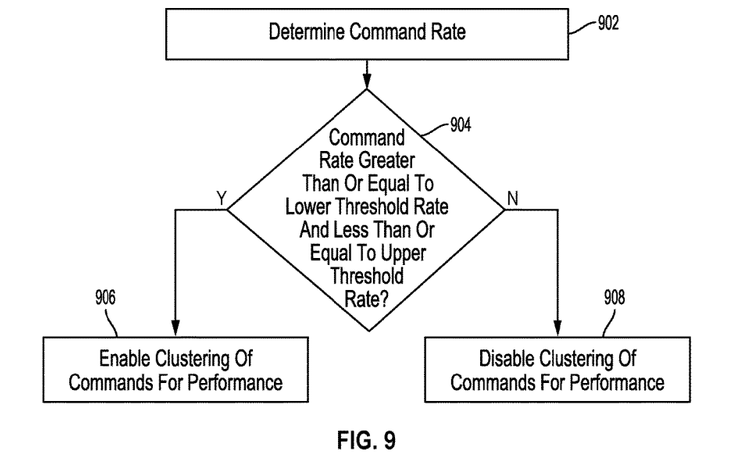
FIG. 9 is a flowchart for an enabling and disabling process for clustering commands that includes a lower threshold rate according to an embodiment.

FIG. 9 is a flowchart for an enabling and disabling process for command clustering that includes a lower threshold rate. The process of FIG. 9 can be performed by controller 120 executing firmware 12 according to an embodiment.

The description of blocks 902, 906, and 908 substantially correspond to the description provided above for FIG. 8 with respect to blocks 802, 806, and 808, respectively. An understanding of blocks 902, 906, and 908 can therefore be obtained with reference to the description of blocks 802, 806, and 808 for FIG. 8 above.

However, the comparison of the command rate determined in block 904 of FIG. 9 differs from the comparison in block 804 of FIG. 8 in that controller 120 determines in block 904 whether the command rate is greater than or equal to a lower rate threshold and less than or equal to an upper threshold rate. The lower threshold rate can correspond to command rate A in FIG. 5, below which the clustering of commands does not reduce the amount of time that a fly-height heater is on. The clustering of commands in the process of FIG. 9 may therefore be disabled below the lower threshold rate since the additional processing overhead and the waiting to reach the cluster size may not reduce the time that the fly-height heater is on when the command rate is below the lower threshold rate. In some implementations, the comparison in block 904 may instead determine whether the command rate is greater than the lower threshold rate as opposed to greater than or equal to the lower threshold rate. If the command rate is below the lower threshold rate in block 904, the clustering of commands for performance is disabled in block 908.

Figure 10:
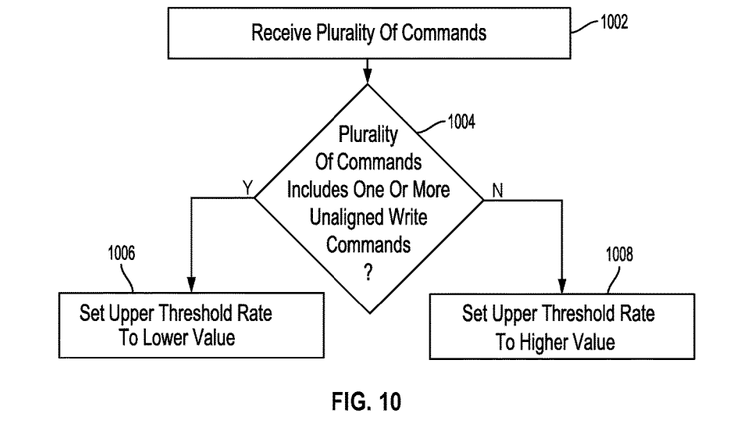
FIG. 10 is a flowchart for an upper threshold rate setting process according to an embodiment.

FIG. 10 is a flowchart for an upper threshold rate setting process that can be performed by controller 120 executing firmware 12 according to an embodiment. The upper threshold rate may be set or selected from threshold rates 20 based on the types of commands being received from host 101 or from a variety of different hosts. In the example process of FIG. 10, the upper threshold rate is set based on whether a plurality of commands received from the host or hosts include one or more unaligned write commands.

As discussed above with reference to FIGS. 6A and 6B, the cross-over command rate where a fly-height heater is on for longer with clustering than without clustering can depend on whether the commands are aligned or unaligned write commands. Unaligned write commands typically require more heating by the fly-height heater because each unaligned write command usually involves first reading data from a sector with heating in addition to writing data with heating as part of a read-modify-write operation. The cross-over command rate is therefore lower for unaligned write commands than for aligned write commands that do not require reading data from the sector before performing the write.

In other embodiments, the upper threshold rate may be set when the DSD is formatted. For example, a DSD may be formatted as part of a manufacturing process to emulate 512 byte block sizes (i.e., 512 e) even though the actual size of physical sectors on its disk surfaces may be 4,096 bytes. In such an example, a lower value for an upper threshold may be selected to account for the fly-height heater needing to be on more for unaligned write commands. On the other hand, if the DSD is formatted for a native block size that will match the block size used by the host (e.g., 512 n or 4 kn), a higher value for the upper threshold may be selected to allow for command clustering at higher command rates.

In the embodiment of FIG. 10, a plurality of commands is received in block 1002 from host 101 for reading and/or writing data on disk 162. In some implementations, the plurality of commands may only include random host commands for reading or writing data associated with non-sequential logical addresses. In other implementations, the plurality of commands may include a mix of sequential and random commands. In addition, the plurality of commands may or may not all be for a particular disk surface.

In block 1004, controller 120 determines whether the plurality of commands includes one or more unaligned write commands. For example, some or all of the commands received in block 1002 may be read commands or may be aligned write commands to write data that completely fills a whole number of sectors. In some implementations, controller 120 may instead determine in block 1004 whether all or a certain percentage of the commands received in block 1002 are unaligned write commands, such as whether at least half of the commands are unaligned write commands. In addition, other implementations may only determine whether the received commands include one or more write commands with an assumption that all write commands received from host 101 are unaligned write commands if it is previously determined that host 101 logically addresses all data at a smaller size than a sector size used on disk 162.

If it is determined in block 1004 that the plurality of commands includes one or more unaligned write commands, controller 120 in block 1006 sets the upper threshold rate to a lower value. In the example of FIGS. 6A and 6B, the lower value for the upper threshold rate can be command rate $C_B$ in FIG. 6B of approximately 160 commands per second, as opposed to the higher value of $C_A$ in FIG. 6A of approximately 300 commands per second.

If it is determined in block 1004 that the plurality of commands does not include one or more unaligned write commands, controller 120 in block 1008 sets the upper threshold rate to a higher value than that in block 1006. In the example of FIGS. 6A and 6B, the higher value for the upper threshold rate can be command rate of $C_A$ in FIG. 6A of approximately 300 commands per second. By setting the upper threshold rate based on the type of commands being received, it is ordinarily possible to better reduce the overall time that TFC is on by disabling the clustering of commands when the command rate reaches a cross-over point where the clustering of commands may no longer reduce the TFC on time.

As discussed above, reducing the amount of time that a fly-height heater is on (i.e., the TFC on time), can help prolong the usable life of the slider and/or head associated with the fly-height heater. This can result in less deterioration of the slider and head materials due to heat, less contact with a disk surface lubricant or the disk surface itself due to the lower fly height caused by the heating, and/or less accumulation of disk surface lubricant on the head or slider.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a DSP, an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive.

What is claimed is:
1. A Data Storage Device (DSD), comprising:
magnetic storage media;
a head configured to read and write data on the magnetic storage media;
a fly-height heater configured to adjust a flying height of the head while it is flying over the magnetic storage media; and
a controller configured to:
receive a plurality of commands from a host to perform at least one of reading and writing data on the magnetic storage media; and
cluster the plurality of commands for performance based at least in part on a timing control of the fly-height heater.

2. The DSD of claim 1, wherein the plurality of commands includes at least one of random commands to read data and to write data associated with non-sequential logical addresses.

3. The DSD of claim 1, wherein the controller is further configured to cluster the plurality of commands for performance into a cluster size of a predetermined period of time.

4. The DSD of claim 1, wherein the controller is further configured to:
  determine a command rate for the plurality of commands;
  compare the determined command rate to an upper threshold rate; and
  enable or disable the clustering of commands for performance based on the comparison of the determined command rate to the upper threshold rate.

5. The DSD of claim 4, wherein the controller is further configured to:
  disable clustering of commands for performance if the determined command rate is above the upper threshold rate; and
  enable clustering of commands for performance if the determined command rate is below the upper threshold rate.

6. The DSD of claim 4, wherein the controller is further configured to:
  determine whether the plurality of commands includes one or more unaligned write commands for writing an amount of data that does not completely fill a whole number of sectors on the magnetic storage media; and
  set the upper threshold rate based on whether the plurality of commands includes one or more unaligned write commands.

7. The DSD of claim 6, wherein the controller is further configured to set the upper threshold rate to a lower value if the plurality of commands includes one or more unaligned write commands than if the plurality of commands includes no unaligned write commands.

8. The DSD of claim 1, wherein the controller is further configured to:
  determine a command rate for the plurality of commands;
  compare the determined command rate to a lower threshold rate; and
  enable or disable the clustering of commands for performance based on the comparison of the determined command rate to the lower threshold rate.

9. The DSD of claim 1, wherein in clustering the plurality of commands for performance, the controller is further configured to exclude commands from the clustering that are for reading or writing data greater than a predetermined size.

10. A method, comprising:
  receiving a plurality of commands from a host to perform at least one of reading and writing data on a magnetic storage media of a Data Storage Device (DSD);
  clustering the plurality of commands for performance to reduce the amount of time that a fly-height heater of the DSD is on, wherein the fly-height heater is configured to adjust a flying height of a head of the DSD while the head is flying over the magnetic storage media; and
  performing a cluster of commands including the plurality of commands by controlling the head to perform at least one of reading and writing data on the magnetic storage media for the cluster of commands.

11. The method of claim 10, wherein the plurality of commands is clustered based at least in part on a timer value for keeping the fly-height heater on during and after performing a last command of the plurality of commands.

12. The method of claim 10, wherein the plurality of commands includes random commands to perform at least one of reading data and writing data associated with non-sequential logical addresses.

13. The method of claim 10, wherein the method further comprises clustering the plurality of commands for performance into a cluster size of a predetermined period of time.

14. The method of claim 10, further comprising:
  determining a command rate for the plurality of commands;
  comparing the determined command rate to an upper threshold rate; and
  enabling or disabling the clustering of the plurality of commands for performance based on the comparison of the determined command rate to the upper threshold rate.

15. The method of claim 14, further comprising:
  disabling clustering of commands for performance if the determined command rate is above the upper threshold rate; and
  enabling clustering of commands for performance if the determined command rate is below the upper threshold rate.

16. The method of claim 14, further comprising:
  determining whether the plurality of commands includes one or more unaligned write commands for writing an amount of data that does not completely fill a whole number of sectors on the magnetic storage media; and
  setting the upper threshold rate based on whether the plurality of commands includes one or more unaligned write commands.

17. The method of claim 16, further comprising setting the upper threshold rate to a lower value if the plurality of commands includes one or more unaligned write commands than if the plurality of commands includes no unaligned write commands.

18. The method of claim 10, further comprising:
  determining a command rate for the plurality of commands;
  comparing the determined command rate to a lower threshold rate; and
  enabling or disabling the clustering of commands for performance based on the comparison of the determined command rate to the lower threshold rate.

19. The method of claim 10, wherein in clustering the plurality of commands for performance, the method further comprises excluding commands from the clustering that are for reading or writing data greater than a predetermined size.

20. A non-transitory computer readable medium storing computer-executable instructions, wherein when the computer-executable instructions are executed by a controller of a Data Storage Device (DSD), the computer-executable instructions cause the controller to:
  receive a plurality of commands from a host to perform at least one of reading and writing data on a magnetic storage media of the DSD;
  cluster the plurality of commands for performance based at least in part on a timing control of a fly-height heater of the DSD, the fly-height heater configured to adjust a flying height of a head of the DSD while the head is flying over the magnetic storage media; and
  perform a cluster of commands including the plurality of commands by controlling the head to perform at least one of reading and writing data on the magnetic storage media for the cluster of commands.

* * * * *